United States Patent
Bruas

(10) Patent No.: US 8,095,066 B2
(45) Date of Patent: Jan. 10, 2012

(54) METHOD OF OPTIMIZING THE RESOURCES USED IN A SATELLITE OR AIRCRAFT TELECOMMUNICATIONS SYSTEM

(75) Inventor: Patrick Bruas, Livry Gargan (FR)

(73) Assignee: Thales (FR)

( * ) Notice: Subject to any disclaimer, the term of this patent is extended or adjusted under 35 U.S.C. 154(b) by 645 days.

(21) Appl. No.: 12/206,269

(22) Filed: Sep. 8, 2008

(65) Prior Publication Data
US 2009/0129311 A1 May 21, 2009

(30) Foreign Application Priority Data
Sep. 11, 2007 (FR) ..................... 07 06361

(51) Int. Cl.
| | |
|---|---|
| H04B 7/185 | (2006.01) |
| H04B 1/38 | (2006.01) |
| H04W 4/00 | (2009.01) |
| H04W 72/00 | (2009.01) |
| H04M 1/00 | (2006.01) |
| G01S 19/29 | (2010.01) |
| G01R 31/08 | (2006.01) |
| G06F 11/00 | (2006.01) |
| G06F 9/46 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |

(52) U.S. Cl. ...... 455/12.1; 455/13.4; 455/427; 455/450; 455/574; 342/357.68; 370/252; 370/315; 370/329; 718/100

(58) Field of Classification Search .......... 455/12.1, 455/13.4, 427, 450, 574; 342/357.68, 357.88; 370/252, 315, 316, 329; 718/100
See application file for complete search history.

(56) References Cited

U.S. PATENT DOCUMENTS
4,113,997 A * 9/1978 Horna ................. 379/406.06
(Continued)

FOREIGN PATENT DOCUMENTS
WO WO0137588 5/2001
WO WO2006132554 12/2006

OTHER PUBLICATIONS
Bruce Bennett et al., "DVS-S2 Technology Development for DoD IP SATCOM," Military Communications Conference, 2006, pp. 1-7.
(Continued)

Primary Examiner — Nay A Maung
Assistant Examiner — Paul P Tran
(74) Attorney, Agent, or Firm — Lowe Hauptman Ham & Berner, LLP

(57) ABSTRACT

The invention relates to a method of optimizing the resources used in a satellite or aircraft telecommunications system (on-board segment). The method includes expressing the difference in consumption $E_{dB}$ between the consumption of onboard power and the consumption of onboard bandwidth as a function of a plurality of terms including a quality indicator, an informational term expressing onboard parameters and a corrective term. The quality indicator $QaF'$ depends on the antenna system, onboard and on the ground, and on conditions of propagation and interference of the medium. The informational term $\mathfrak{I}_{dB}$ depends on modem parameters. The term $K'$ depends on onboard parameters such as the maximum incoming flux density and the bandwidth. A corrective term $C_{dB}$ characterizing the consumption of onboard power attributable to the upward noise which is amplified and transposed on board. At least one of the parameters $QaF'$, $K'$, $\mathfrak{I}_{dB}$ is modified in order to tend toward the cancellation of the absolute value of the term $E_{dB}$.

11 Claims, 2 Drawing Sheets

U.S. PATENT DOCUMENTS

| | | | |
|---|---|---|---|
| 5,835,847 A * | 11/1998 | Gilmore et al. | 455/12.1 |
| 5,969,675 A * | 10/1999 | Erlick | 342/373 |
| 6,185,409 B1 | 2/2001 | Threadgill et al. | |
| 6,463,279 B1 * | 10/2002 | Sherman et al. | 455/427 |
| 7,043,199 B2 * | 5/2006 | Dai et al. | 455/13.4 |
| 7,203,942 B2 * | 4/2007 | Lafruit et al. | 718/100 |
| 7,916,680 B2 * | 3/2011 | Miller et al. | 370/315 |
| 2008/0268788 A1 * | 10/2008 | Bruas | 455/67.13 |

OTHER PUBLICATIONS

Brand J ED—Institute of Electrical and Electronics Engineers: "Optimizing the Warfighters Non-processing Satellite Transponder Utilization." Military Communications Conference. Milcom 2002. Proceedings. Anaheim, CA, Oct. 7-10, 2002, IEEE Military Communications Conference, New York, NY: IEEE, US, vol. 1 of 2, Oct. 7, 20082, pp. 1402-1405, XP010630988, ISBN: 0-7803-7625-0.

Brand J: "Practical On-The-Move Satellite Communications for Present and Future Mobile Warfighters." Military Communications Conference, 2005, Milcom 2005, IEEE Atlantic City, NJ, USA Oct. 17-20, 2005, Piscataway, NJ, USA, IEEE, Oct. 17, 2005, pp. 1-5, XP010901592, ISBN: 0-7803-9393-7.

Bruce Bennett, "DVB-52 Technology Development for DoD IP SATCOM", Military Communications Conference, 2006.

* cited by examiner

METHOD OF OPTIMIZING THE RESOURCES USED IN A SATELLITE OR AIRCRAFT TELECOMMUNICATIONS SYSTEM

RELATED APPLICATIONS

The present application is based on, and claims priority from, French Application Number 0706361, filed Sep. 11, 2007, the disclosure of which is hereby incorporated by reference herein in its entirety.

FIELD OF THE INVENTION

The present invention relates to a method of optimizing the resources used in a satellite or aircraft telecommunications system. The invention can notably be used in a network planning phase, during the deployment of a communications system between stations of the terrestrial segment, the system using one or more onboard repeaters, that is to say present on a satellite or on an aircraft.

BACKGROUND OF THE INVENTION

In a satellite telecommunications system, often called a "Satcom" system, earth stations communicate with each other via one or more repeaters in a transparent manner. The earth stations are provided with at least one modem, one frequency transposition module for each direction (for transmission, referenced Tx, and for reception, referenced Rx), one amplifier for each direction (Tx and Rx) and with an antenna, such that a transmitting station modulates the signals according to an appropriate waveform, sends signals which modulate a carrier wave ascending to the repeater, which amplifies them, transposes them and retransmits them to the ground on a descending carrier wave, a receiving station capturing the descending carrier wave in order to demodulate the signals. In order to obtain good performance at a minimal cost, the allocation of the resources used in the Satcom links must be optimized. Several criteria are involved in the performance of these links and their implementation cost. In order to increase the capacity of the network, it is possible, for example, either to increase the size of the antennas on the ground, or to increase the bandwidth (sometimes leased) of the repeater or to increase the Equivalent Isotropically Radiated Power (Puissance Isotrope Rayonée Equivalente-PIRE) at saturation of the repeater or its operational gain, each of these options also generating a corresponding additional financial cost.

The adjustment of certain elements of the communication system makes it possible to optimize the resources used. A first element to be minimized is the consumption of resources in the space segment, in other words the allocated bandwidth and the power used. A second element relates to the size of the equipment on the ground, notably the sizes of the antennas. A third element to be optimized is the setup of the modems, a good setup making it possible to increase the capacity of the system, that is to say the network spectral efficiency, referenced $\eta$. The spectral efficiency of the network is the capacity/allocated bandwidth ratio of the repeater, the capacity being the sum of the useful data rates of all the carriers which share that same allocated bandwidth of the repeater. Knowing that the modification of one of the aforesaid elements affects the connected elements, the problem of optimization of the resources used means the overall optimization of these three elements.

A system is said to be limited by power (or by bandwidth) when 100% of the power (or, respectively, of the bandwidth) available onboard is reached whereas the whole of the bandwidth (or of the power respectively) available on board is not consumed. It is known that in order to optimize the space resources, the Satcom system must neither be limited by bandwidth nor limited by power, which is equivalent to balancing the spectral consumption on board and the power consumption on board. In practice, this principle of balance naturally results in reducing the size of the antennas for a given network spectral efficiency or in increasing the network spectral efficiency for a given size of antennas. In the case of a heterogeneous set of antennas, optimization is carried out per antenna class, that is to say per group of connections sharing the same quality indicator (the "iso-QaF" class of connections will be described and the quality factor "QaF" is defined below). In order to increase the network spectral efficiency, either the capacity at constant bandwidth is increased, or the leased bandwidth on the satellite at constant capacity is reduced. It is also known that the modulation spectral efficiency is to be adapted according to the size of the antenna of the receiving stations. Notably, the following two articles published by the MILCOM can be mentioned:

Jerry Brand, "Optimizing the warfighter's non-processing satellite transponder utilization", Military Communications Conference, 2002;

Bruce Bennett, "DVB-S2 Technology Development for DoD IP SATCOM", Military Communications Conference, 2006.

More generally, it is known that there is a relationship between the modem parameters and the antenna parameters, but this relationship is not simply expressed and, at present, no method of the prior art makes it possible to plan the resources to be allocated in a Satcom network simply and in an optimal manner. In general, link budget experts use iterative algorithms in which several tens of parameters (or even about a hundred of them) are involved. The experience of these experts then guides their setup choices in order to refine the allocation of the resources for each equipment of the network. The methods used by these experts are multiple, suffer from a lack of transparency and often do not make it possible to obtain the result in just a few simple operations.

As a preamble, a list of the notations used subsequently for indicating physical values is given below:

e (adimensional), the modulation spectral efficiency (not to be confused with the Naperian number in the continuation of the text, particularly when $\log_{10} e$ will be written);

$E_b/N_o$ (in dB), the mean energy per user bit $E_b$ over the monolateral noise power spectral density $N_0$, at the input of the demodulator;

$\Delta F$ (in Hz), the spectral bandwidth of the channel corresponding to a modulated carrier;

D (in bps), the useful data rate transmitted on the channel;

B (in Hz), the spectral bandwidth of the repeater;

$\text{conso}^{PW}$ (%), the percentage used by a carrier of the power of the repeater;

$\text{conso}^{BW}$ (%), the percentage used by a carrier of the bandwidth of the repeater;

$\text{PIREsol}_{dB}$ (en dBW), the Equivalent Isotropically Radiated Power transmitted by a carrier from the earth station;

SFD (in dBW/m²), the saturation flux density of the repeater;

IBO (in dB), the back-off at the input of the repeater;

$A_{up}$ (in dB), the total attenuation of the uplink;

$\Delta A_{up}^{fs}$ (in dB), the additional free-space attenuation of the uplink with respect to the attenuation of the sub-satellite point (the upper index corresponds to "free-space");

$A_{up}^{nfs}$ (in dB), the attenuation and the losses out of free space of the uplink (due, for example, to rain, scintillation, clouds, gases, misalignment and to the precision of the transmitted power level);

$M_{sys}$ (in dB), the system margin.

SUMMARY OF THE INVENTION

One purpose of the invention is to propose a simple method making it possible to optimize the allocation of the resources used in a satellite or aircraft communications system. For this purpose, the subject of the invention is a method of optimizing the resources used in the telecommunications carried out via an onboard segment, formed by a satellite or by an aircraft, between stations of the terrestrial segment comprising at least one modem, characterized in that it comprises at least the following steps:

expressing the difference in consumption $E_{dB}$ (in dB) between the consumption of onboard bandwidth and the consumption of onboard power as a function of the following terms:

a quality indicator QaF' (in dBHz/W) depending on the antenna system (onboard and on the ground) and on conditions of propagation and interference of the medium, an informational term $\Im_{dB}$ (in dB) depending on modem parameters, a term K' (in dBW/Hz) depending on onboard parameters (maximum incoming flux density and bandwidth), a corrective term $C_{dB}$ (in dB) characterizing the consumption of onboard power attributable, on the one hand, to the upward noise which is amplified and transposed on board and, on the other hand, to the noise generated on board, notably by intermodulation products;

modifying at least one of the parameters QaF', K', $\Im_{dB}$ in order to tend toward the cancellation of the absolute value of the term expressed in a logarithmic scale $E_{dB}$.

According to one implementation of the optimizing method, the difference $E_{dB}$ (in a logarithmic scale) between the onboard bandwidth consumption and the onboard power consumption is equal to:

$$QaF'+K'-\Im_{dB}-C_{dB} \quad [E0]$$

According to one implementation of the optimizing method, the satellite or the aircraft comprises at least one repeater, and the parameter K', expressed in dBW/Hz, is equal to $$K'=DF_{max}+10\log_{10}(4\pi d^2)-10\log_{10}(B)+\text{margin} \quad [E0bis]$$

B being equal to the spectral bandwidth of the repeater, d being equal to the distance between the onboard system and the transmitting earth station, $DF_{max}$ being equal to the maximum flux density admissible at the input of the repeater in the direction of the transmitting earth station (this is therefore an algebraic sum of the edge-of-coverage value and the upward geographic advantage of the earth station) and possibly taking into account a "breathing" space of the system due to chance (this is explained below), "margin" being additional losses with respect to free space losses (of which some components are compensated for by the "breathing" space) of the uplink, K' therefore being homogeneous with a maximum PIRE spectral density in the bandwidth B of the repeater and transmitted from the ground.

According to one implementation of the optimizing method, the parameter $\Im_{dB}$ is equal to $$\frac{E_b}{N_0}+10\log_{10}(e)$$

$E_b/N_o$, being the mean energy per user bit $E_b$ over the monolateral noise power spectral density $N_0$, at the input of the demodulator of the receiving station, e being the modulation spectral efficiency.

According to one implementation of the optimizing method, the parameter QaF, expressed in dBHz/W, is equal to the quantity that is taken from the noise density $(C/No)_{requis}$ in dBHz (with a system margin here), in order to find the value of $PIRE_{sol}$ (dBW).

In fact, there is the equation $QaF=(C/No)_{requis}-PIRE_{sol}$ (see below)

Where, by notational convention, $$(C/No)_{requis} = \frac{E_b}{N_0}+10\log_{10}(D)+M_{sys}$$

and where, by purely notational convention, the following two prime values are used in the text:

$$QaF'=QaF-M_{sys} \text{ et } K'=-K+M_{sys}$$

The Satcom stations of the terrestrial segment can be placed on the ground or on a naval or air carrier such as a helicopter for example.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

The method according to the invention is based on the use of the following equation (equivalent to the equation [E0]) which will be explained below:

$$E_{dB}=QaF-K-\Im_{dB}-C_{dB} \quad [E16]$$

where:
the antenna parameters (the size and the merit factor of the ground receiving antenna, the gain of the Rx and Tx antennas of the satellite) are grouped in a quality indicator QaF;
the onboard parameters, notably the saturation flux density SFD et le input back-off IBO, to which is here added system margin by notational convention, are grouped in the term K;
the informational parameters which are the modulation spectral efficiency e and the ratio $E_b/N_0$ are grouped in the term $\Im_{dB}$;
the unbalance in consumptions of onboard resources is referenced $E_{dB}$;
$C_{dB}$ is a corrective term, sometimes negligible, characterizing the consumption of onboard power attributable to the upward thermal noise (or even to the interference noise) which is amplified and transposed on board.

Depending on the technical constraints, the equation [E16] can be used in different ways for optimizing the resources of a Satcom system.

In a first case, when the parameters on the ground and the onboard parameters are fixed, that is to say for example when antennas and the repeater are already installed, the use of the equation [E16] makes it possible to adjust the modem parameters in order to maximize the capacity of the Satcom network. In order to do this, it is appropriate to modify the pair of modem parameters (e, $E_b/N_0$), until the difference $E_{dB}$ becomes substantially zero in absolute value.

Figure 1:
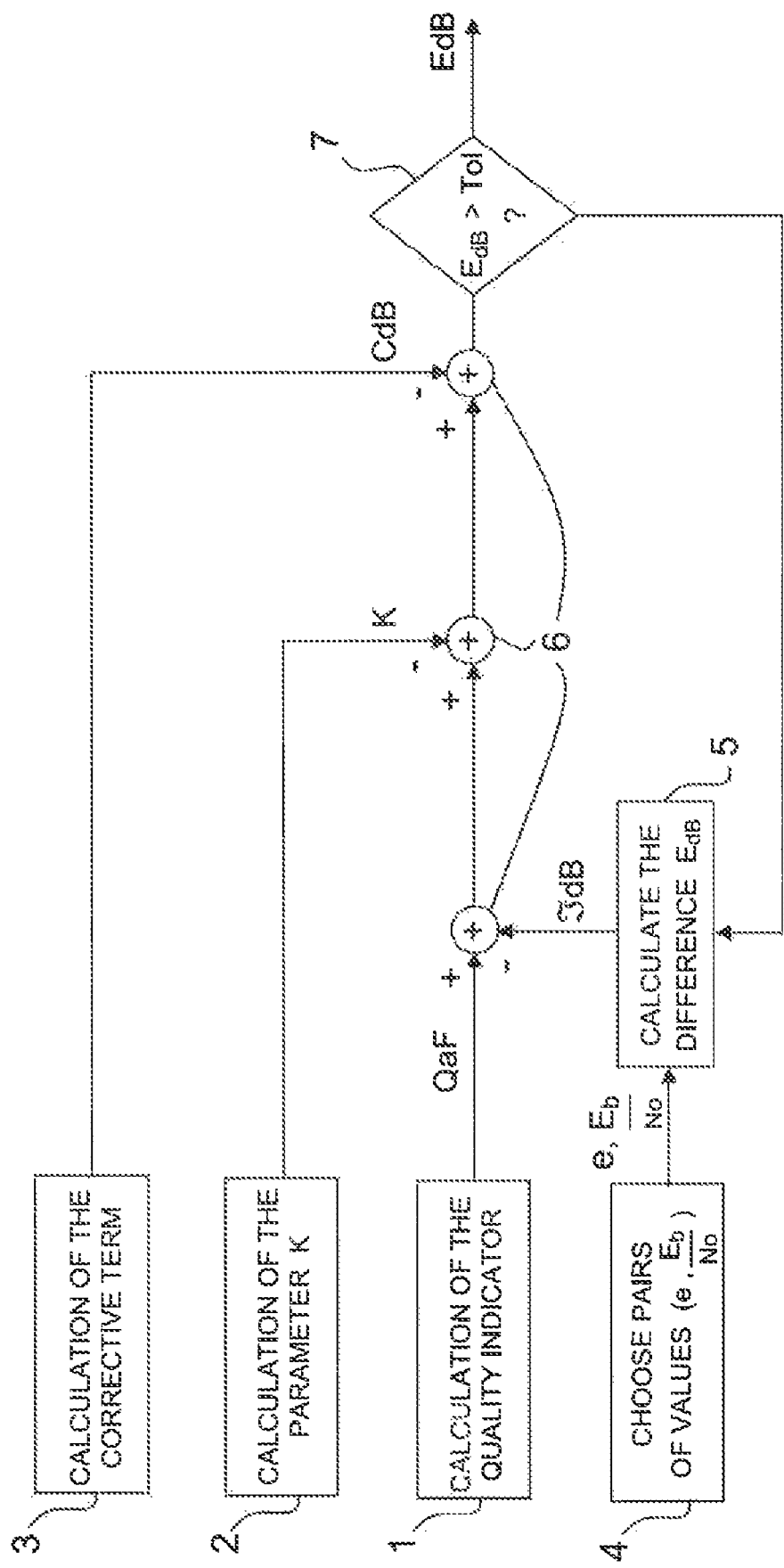
FIG. 1 shows a block diagram illustrating the functioning of the optimizing method according to the invention.

An example of the method corresponding to this first case is given in FIG. 1. It is an iterative method executed, for example, by a calculating processor used during the network planning phase, the method making it possible to tend towards a desired value of $E_{dB}$ by means of successive modifications of the modem parameters. A tolerance Tol can, for example, be fixed with respect to the desired value so that the difference $E_{dB}$ obtained at the end of the complete execution of the method is distanced at most by the value Tol from this desired value. Advantageously, the desired value of the difference $E_{dB}$ is zero, which results in stopping the iterations when the absolute value of the difference $E_{dB}$ is less than or equal to the tolerance Tol. It is also possible to search for the minimum of the absolute value of the difference $E_{dB}$ among all of the configurations of pairs (e, $E_b/N_0$) available for the modem used.

The method according to the example comprises the following steps:
calculation of the quality indicator QaF (1)
calculation of the parameter K (2),
calculation of the corrective term linked with the amplified upward noises (3),
choosing the pairs of values for e and $E_b/N_0$, for example from a table of configurations of the modems on the ground (4)
deriving from this a value of $\Im_{dB}$ (5)
calculating the difference $E_{dB}$ using the equation [E16] (6),
as long as the value of the difference $E_{dB}$ is greater than Tol (7):
modifying the modem parameters e and $E_b/N_0$, (4)
recalculating the parameter $\Im_{dB}$ using the values of e and of $E_b/N_0$ (5),
recalculating a value of the difference $E_{dB}$ (6)
At the end of the execution of this method, the difference $E_{dB}$ is close to zero and the pair of values (e, $E_b/N_0$) is that making it possible to achieve the maximum efficiency with an antenna system (onboard and earth antennas) and a repeater already installed.

This method can notably be applied when multi-spectral efficiency modems are available, making it possible to modify the modulation parameters, for example the number of modulation states, and the channel encoding parameters such as the encoding rate.

In a second case, when the modem parameters and the onboard parameters are already fixed, the equation [E16] can be used for minimizing the size of the antennas on the ground. An iterative method acting on the QaF indicator can be used for obtaining this result. An example of this method is given below:
calculation of the parameter K and the parameter $\Im_{dB}$,
choosing a value of earth antenna Rx diameter, deriving from this the indicator QaF (the explanatory details of which are given below),
calculation of the difference $E_{dB}$ using the equation [E16],
as long as the absolute value of the difference $E_{dB}$ is greater than one:
modifying the value of the antenna diameter,
recalculating the indicator QaF,
recalculating the difference value $E_{dB}$ At the end of the execution of this method, the difference $E_{dB}$ is substantially equal to zero, which means that the chosen size of the antennas is minimal under the fixed constraints of modem and repeater parameters.

A similar method could be used for optimizing the characteristics of the repeater under the constraint of a fixed antenna system and fixed modem parameters, in which case it would be necessary to act on the parameter K.

More generally, it is possible to seek an optimal solution by fixing only one or two of the parameters QaF, K and $\Im_{dB}$, the criterion corresponding to the optimum choice of the parameters remaining the elimination of the difference $E_{dB}$.

The overall optimizing of the network is obtained by proceeding with the optimizing of each iso-QaF class. In this case "iso-QaF class" refers to all of the links which share the same QaF (the same merit factor of the receiving antenna, substantially the same conditions of propagation—and therefore the same link availability—, of interference, of intermodulation and of upward and downward geographic advantages).

In order to understand the equation [E16] better, an explanation is given below.

As explained in the introduction, the balance between the consumption of onboard power and the onboard spectral consumption corresponds to the optimum in terms of the use of resources. By denoting the percentage used (by a carrier) of the onboard power by the term $conso^{PW}$, and the percentage used (by a carrier) of the onboard spectral bandwidth by the term $conso^{BW}$, the optimum can be conditioned to the achieving of the following criterion (for each iso-QaF carrier class):

$$conso^{BW}=conso^{PW} \quad [E1]$$

which criterion, transposed on a logarithmic scale (in decibels in this case), is equivalent to the elimination of a difference $E_{dB}$ between two consumption values $conso^{BW}_{dB}$ and $conso^{PW}_{dB}$. A Satcom system is therefore optimized when $$E_{dB}=conso^{BW}_{dB}-conso^{PW}_{dB}=0 \quad [E2]$$

On the one hand, the spectral consumption $conso^{BW}$ is defined as the ratio of the spectral bandwidth ΔF of the com munication channel to the spectral bandwidth of the repeater B:

$$conso^{BW} = \frac{\Delta F}{B} \qquad [E3]$$

Moreover, the modulation spectral efficiency e is equal to the quotient of the data rate D of data transmitted on the communication channel over the spectral bandwidth ΔF of the said channel:

$$e = \frac{D}{\Delta F} \qquad [E4]$$

which makes it possible to express the onboard spectral consumption as a function of the data rate D, of the spectral bandwidth B of the repeater and of the spectral efficiency e as follows:

$$conso^{BW} = \frac{D}{B} \cdot \frac{1}{e} \qquad [E5]$$

this latter expression, transposed into decibels, is equivalent to the following formula:

$$conso_{dB}^{BW} = 10 \log_{10}(D) - 10 \log_{10}(B) - 10 \log_{10}(e) \qquad [E6]$$

On the other hand, the power consumption $conso^{PW}_{dB}$ in decibels can be expressed as a function of the power transmitted on the ground $PIREsol_{dB}$ and of onboard parameters as follows:

$$conso_{dB}^{PW} = PIREsol_{dB} + K_1 \qquad [E7]$$

where $K_1 = IBO - SFD - 162.1 - A_{up}^{nfs} - \Delta A_{up}^{fs}$

In fact, a geostationary satellite is placed at a distance $d_o$=35, 786 km from the earth's surface at the sub-satellite point, in order words at the point of zero latitude and of the same longitude as that of the satellite. Now, the attenuation of the power of a signal transmitted by a station separated by $d_o$ from the satellite is proportional to the surface of a sphere of radius $d_o$, which, on a logarithmic scale, translates as $10 \cdot \log(4\pi d_o^2) = 162.1$ dBm². Taking the difference between $d_0$ and the real distance $d_{up}$ separating the transmitting station from the satellite into account, the additional free space attenuation is determined as $\Delta A_{up}^{fs} = 20 \log(d_{up}/d_o)$.

By expressing this additional free space attenuation, on a linear scale, as follows: $\Delta A_{up}^{fs} = (d_{up}/d_0)^2$, the flux Φ received by the satellite corresponding to the carrier transmitted at $PIREsol_{dB}$ can be written on a linear scale as:

$$\Phi = \frac{PIREsol_{dB}}{4\pi d_0^2 \cdot A_{up}^{nfs} \cdot \Delta A_{up}^{fs}}$$

and therefore the onboard power consumption is written as:

$$conso^{PW} = \frac{\Phi}{\frac{SFD}{IBO}} \quad \text{such that } SFD = SFD_{eoc} - AvGeo_{up}$$

$SFD_{eoc}$ (in dBW/m²), is the saturation flux density of the onboard zone repeater (the lower index corresponds to "edge-of-coverage");

$AvGeo_{up}$ (in dB), is the upward geographic advantage.

The equation [E7] is obtained again.

It is customary to add an additional back-off margin to allow the system to "breathe" depending on random losses. For example, if the transmitting antenna is not as off-aim as predicted, if the precision of the transmission level is better than expected, if the scintillation is not as high as predicted, or if rain is not present in the path where a statistical rain margin had been provided for, then the flux received on board is higher than foreseen. That is why it is possible to overload the back-off IBO by several decibels in the above formula and consequently in the formula of "K". By combination the expressions [E2], [E6] and [E7], the difference $E_{dB}$ of consumption values can be expressed as follows:

$$E_{dB} = [10 \log_{10}(D) - 10 \log_{10}(B) - 10 \log_{10}(e)] - [PIREsol_{dB} + K_1] \qquad [E8]$$

On adding a system margin $M_{sys}$ and by putting $K = M_{sys} + 10 \log_{10}(B) + K_1$ the difference $E_{dB}$ can be rewritten:

$$E_{dB} = 10 \log_{10}(D) - 10 \log_{10}(e) - PIREsol_{dB} + M_{sys} - K \qquad [E9]$$

Moreover, a patent application published under Number FR2877785 mentions the use of a quality indicator QaF to facilitate the establishment of a Satcom link budget, the name QaF being chosen with reference to the expression "Quality Aggregate Factor", for "total quality figure". As a reminder, this quality indicator QaF is a coefficient of proportionality between the $PIRE_{sol}$ and the power ratio of the power of the signal to the total noise density $C/N_O$ on reception of the said signal. Thus, on a logarithmic scale, the indicator QaF is expressed as the difference between the $PIRE_{sol}$ and the required $(C/N_0)_{req}$ (in which a system margin is incorporated here) in order to comply with a binary error rate making it possible to carry out a demodulation:

$$PIREsol_{dB} = \left(\frac{C}{N_o}\right)_{req} - QaF \qquad [E10]$$

The higher the value of this indicator QaF, the less is the required $PIRE_{sol}$ in order to obtain a $C/N_0$ ratio sufficient to be able to demodulate the signal on reception. The indicator QaF depends on interference having an effect on the link and on the area of the antennas used on the ground and on the satellite or aircraft. The quality indicator equal to the difference between the required $(C/N_0)_{req}$ and the $PIRE_{sol}$, without integrating a system margin, is referenced QaF'.

By combining the expressions [E9] and [E10], the difference $E_{dB}$ between the consumption values can be expressed as a function of the quality indicator QaF:

$$E_{dB} = QaF - K + 10 \log_{10}(D) - \left(\frac{C}{N_o}\right)_{req} + M_{sys} - 10 \log_{10}(e) \qquad [E11]$$

Now, the power C of the signal is equal to the product of the data rate D in bits and the mean energy per user bit $E_b$, which, transposed on a logarithmic scale, results in expressing this power C as follows:

$$(C)_{dB} = (E_b)_{dB} + 10 \log_{10}(D) \qquad [E12]$$

By dividing this power by the noise density $N_0$ received at the demodulator of the receiving station and by integrating the system margin $M_{sys}$ in it, the following is derived:

$$\left(\frac{C}{N_o}\right)_{req} = \left(\frac{E_b}{N_0}\right)_{dB} + 10\log_{10}(D) + M_{sys}, \quad [E13]$$

By combining the expressions [E11] and [E13], the difference $E_{dB}$ between consumptions is expressed as follows:

$$E_{dB} = QaF - K - \frac{E_b}{N_0} - 10\log_{10}(e) \quad [E14]$$

The terms $E_b/N_o$ and $10\log_{10}(e)$ can be gathered into a single term $\mathfrak{I}_{dB}$, the term $\mathfrak{I}_{dB}$ thus grouping the informational parameters related to the modem. Also, the difference $E_{dB}$ between the consumption of onboard power and the onboard spectral consumption can be expressed as follows:

$$E_{dB} = QaF - K - \mathcal{J}_{dB} \quad [E15]$$

$$\text{where } \mathcal{J}_{dB} = \frac{E_b}{N_0} + 10\log_{10}(e)$$

and where $K = M_{sys} + 10\log_{10}(B) - SFD + IBO - 10\log_{10}(4\pi d^2) + -\Delta A_{up}^{fs}$ Knowing the two parameters of the first order high-pass Butterworth filter, defined in the abovementioned patent application numbered FR2877785, which are the gain of the filter (referenced R1) and the −3 dB cut-off diameter of the said filter, and knowing the antenna diameter of the receiving station of the link, the quality indicator QaF can be calculated in two operations. As the calculation of the other parameters of the equation [E15] is fast, it is thus demonstrated that the method according to the invention necessitates few calculation operations.

The term "K'" (in dBW/Hz), such that $K' = -K + M_{sys}$, can be interpreted as the spectral density of maximum PIRE which would be transmitted from the ground in band B, that is to say that which corresponds to an incoming flux at the satellite of value $DF_{max} = SFD - IBO$. The equations [E0] and [E0bis] are thus obtained again from the demonstrated expression [E15].

If the upward noise (thermal noise and possible interference and/or possible onboard intermodulations) is not negligible in terms of onboard power consumption, the equation [E15] is refined by adding a corrective term $C_{dB}$:

$$E_{dB} = QaF - K - \mathcal{J}_{dB} - C_{dB} \quad [E16]$$

$$\text{where } C_{dB} = 10\log_{10}\left(1 + \frac{\Delta F}{(C/No)_{up}}\right)$$

where $(C/No)_{up}$ is the signal to noise density ratio obtained by all of the upward noises (at least the thermal noise) and possibly the noises generated on board, notably by intermodulations.

Figure 2:
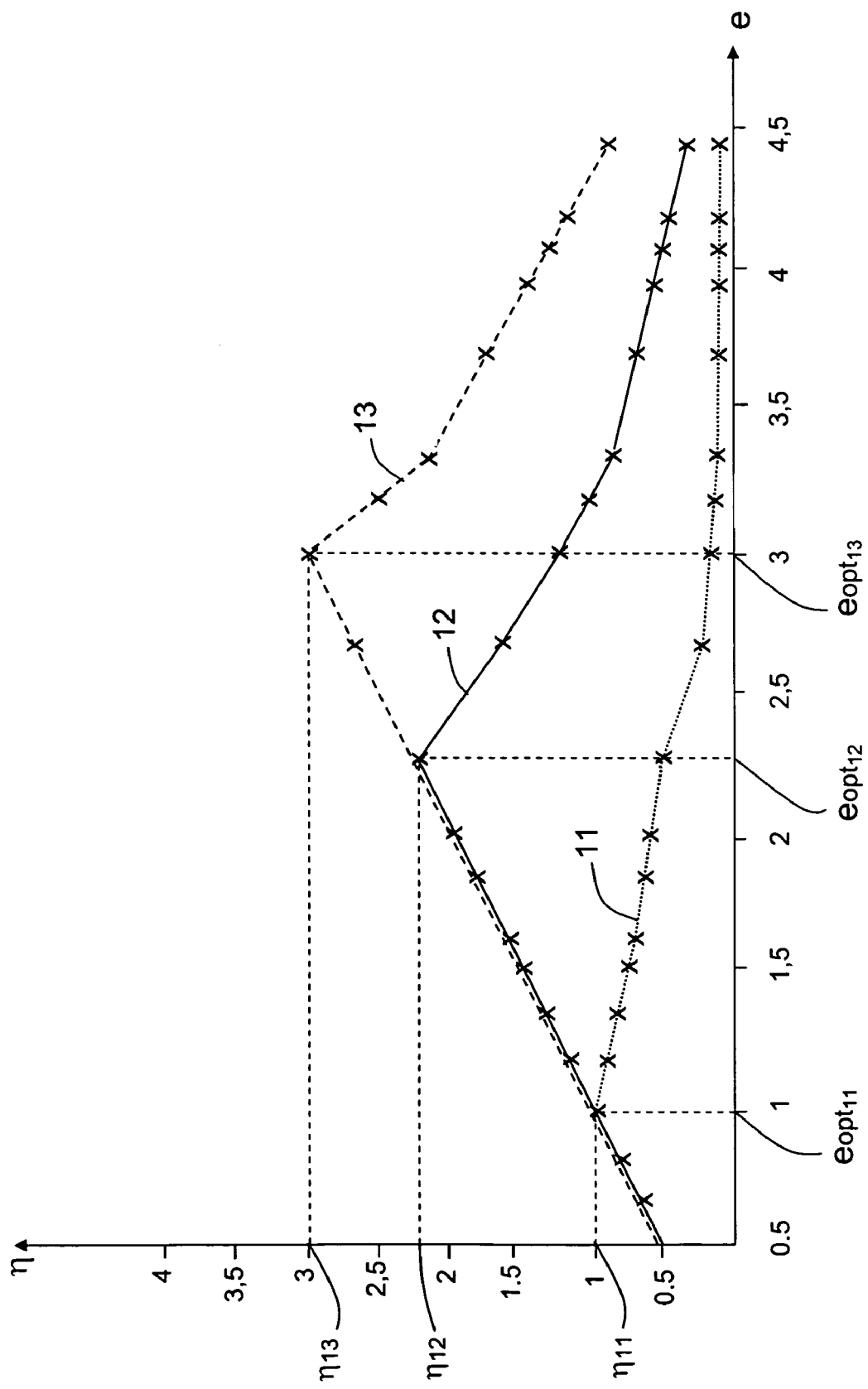
FIG. 2 is a graphical representation showing the variation of network spectral efficiency, referenced η, as a function of the modulation spectral efficiency, referenced e, for different values of the indicator QaF.

FIG. 2 gives an example showing the variation of the spectral efficiency $\eta$ of a Satcom network as a function of the spectral modulation efficiency e for different values of the indicator QaF.

Each value of the indicator QaF corresponds to a different curve 11, 12, 13 in increasing order of QaF. The higher the QaF indicator, the greater is the capacity of the Satcom network, since the indicator QaF increases with an improvement in the performance of the antenna system used.

Moreover, each of the curves 11, 12, 13 passes through a maximum spectral efficiency value of the network $\eta_{11}$, $\eta_{12}$, $\eta_{13}$. Each maximal value $\eta_{11}$, $\eta_{12}$, $\eta_{13}$ is obtained by choosing an optimal modulation spectral efficiency e, $e_{opt11}$, $e_{opt12}$, $e_{opt13}$, corresponding to the balance between the spectral consumption and the power consumption. A spectral modulation efficiency value e which is distant with respect to the optimal value $e_{opt11}$, $e_{opt12}$, $e_{opt13}$ indicates a bad configuration of the modem. In fact, when the modulation spectral efficiency e is less than the optimal value, the Satcom system is limited by bandwidth ($E_{dB} > 0$), in other words a portion of the available power is not used. That is why it is necessary to increase the "e" parameter and therefore the quantity $\mathfrak{I}_{dB}$, which reduces the difference $E_{dB}$. Inversely, when the modulation spectral efficiency e is higher than the optimal value, the Satcom system is limited by power ($E_{dB} < 0$), which means that a portion of the available bandwidth is not used. That is why it is necessary to reduce the parameter "e" and therefore the quantity $\mathfrak{I}_{dB}$, which increases the difference $E_{dB}$. The method according to the invention makes it possible to reach these optimal values $e_{opt11}$, $e_{opt12}$, and $e_{opt13}$ quickly.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A method of optimizing resources used in telecommunications carried out via an onboard segment, formed by a satellite or by an aircraft, between stations of a terrestrial segment comprising at least one modem, said method comprising:
   expressing a difference in consumption $E_{dB}$ between the consumption of onboard bandwidth and the consumption of onboard power as a function of the following terms:
   a quality indicator QaF' depending on the antenna system, onboard and on the ground, and on conditions of propagation and interference of the medium,
   an informational term $\mathfrak{I}_{dB}$ depending on modem parameters,
   a term K' depending on onboard parameters including the maximum incoming flux density and the bandwidth,
   a corrective term $C_{dB}$ characterizing the consumption of onboard power attributable to the upward noise which is amplified and transposed on board; and
   modifying at least one of said QaF', K', $\mathfrak{I}_{dB}$ in order to tend toward a cancellation of an absolute value of the term expressed in a logarithmic scale $E_{dB}$.

2. The optimizing method according to claim 1, wherein the difference $E_{dB}$ between the onboard bandwidth consumption and the onboard power consumption is equal to:

$$E_{dB} = \text{conso}_{dB}^{BW} - \text{conso}_{dB}^{PW} = QaF' + K' - \mathfrak{I}_{dB} - C_{dB}.$$

3. The optimizing method according to claim 1, wherein the satellite or aircraft comprises at least one repeater, wherein the parameter K', expressed in dBW/Hz, is equal to $$K' = DF_{max} + 10\log(4\pi d^2) - 10\log_{10}(B) + \text{margin},$$

B being equal to the spectral bandwidth of the repeater,
d being equal to the distance between earth station Rx and the onboard system, $DF_{max}$ being equal to the maximum flux admissible at the input of the repeater and "margin" being additional losses with respect to free space losses of the uplink.

4. The optimizing method according to claim 1, wherein the parameter $\Im_{dB}$ is equal to $$\frac{E_b}{N_0} + 10\log_{10}(e)$$

$E_b/N_o$, being the mean energy per user bit $E_b$ over the monolateral noise power spectral density $N_0$, at the input of the demodulator of the receiving station, e being the modulation spectral efficiency.

5. The optimizing method according to claim 1, wherein the parameter QaF', expressed in dBHz/W, is equal to the quantity that is taken from the noise density $(C/No)_{requis}$ in dBHz in order to find the value of $PIRE_{sol}$ (dBW).

6. The optimizing method according to claim 2, wherein the satellite or aircraft comprises at least one repeater, wherein the parameter K', expressed in dBW/Hz, is equal to $$K'=DF_{max}+10\log(4\pi d^2)-10\log_{10}(B)+\text{margin},$$

B being equal to the spectral bandwidth of the repeater, d being equal to the distance between earth station Rx and the onboard system, $DF_{max}$ being equal to the maximum flux admissible at the input of the repeater and "margin" being additional losses with respect to free space losses of the uplink.

7. The optimizing method according to claim 2, wherein the parameter $\Im_{dB}$ is equal to $$\frac{E_b}{N_0} + 10\log_{10}(e)$$

$E_b/N_o$, being the mean energy per user bit $E_b$ over the monolateral noise power spectral density $N_0$, at the input of the demodulator of the receiving station, e being the modulation spectral efficiency.

8. The optimizing method according to claim 3, wherein the parameter $\Im_{dB}$ is equal to $$\frac{E_b}{N_0} + 10\log_{10}(e)$$

$E_b/N_o$, being the mean energy per user bit $E_b$ over the monolateral noise power spectral density $N_0$, at the input of the demodulator of the receiving station, e being the modulation spectral efficiency.

9. The optimizing method according to claim 2, wherein the parameter QaF', expressed in dBHz/W, is equal to the quantity that is taken from the noise density $(C/No)_{requis}$ in dBHz in order to find the value of $PIRE_{sol}$ (dBW).

10. The optimizing method according to claim 3, wherein the parameter QaF', expressed in dBHz/W, is equal to the quantity that is taken from the noise density $(C/No)_{requis}$ in dBHz in order to find the value of $PIRE_{sol}$ (dBW).

11. The optimizing method according to claim 4, wherein the parameter QaF', expressed in dBHz/W, is equal to the quantity that is taken from the noise density $(C/No)_{requis}$ in dBHz in order to find the value of $PIRE_{sol}$ (dBW).

\* \* \* \* \*